United States Patent [19]

Fischbach

[11] Patent Number: 4,575,897
[45] Date of Patent: Mar. 18, 1986

[54] HANDLE ATTACHMENT FOR A HOLLOW ACCESSORY HANDLE WHICH IS FORMED OF SHEET METAL

[75] Inventor: Wolfgang Fischbach, Daaden, Fed. Rep. of Germany

[73] Assignee: Heinrich Baumgarten KG Eisen- und Blechwarenfabrik, Neunkirchen, Fed. Rep. of Germany

[21] Appl. No.: 738,531

[22] Filed: May 24, 1985

[30] Foreign Application Priority Data

Feb. 10, 1982 [DE] Fed. Rep. of Germany ....... 3204641

[51] Int. Cl.[4] ............................................. A47J 45/10
[52] U.S. Cl. ................................ 16/110 A; 16/114 A; 16/DIG. 24
[58] Field of Search ............ 16/110 A, 114 A, 110 R, 16/114 R, 124, 125, DIG. 12, DIG. 18, DIG. 19, DIG. 24, DIG. 25, DIG. 40, 110.5; 294/33, 27.1; 403/361

[56] References Cited

U.S. PATENT DOCUMENTS 4,127,914 12/1978 Fischbach .................... 16/114 A X
4,387,484 6/1983 Fischbach ........................ 16/110 X

FOREIGN PATENT DOCUMENTS 7609915 3/1977 Netherlands ..................... 16/110 A
1520021 8/1978 United Kingdom ............. 16/114 A Primary Examiner—Donald R. Schran
Assistant Examiner—James L. Wolfe
Attorney, Agent, or Firm—Flynn, Thiel, Boutell & Tanis

[57] ABSTRACT

Handle attachment for a hollow accessory sheet-metal handle on dishes. A support bar is provided which is fastened to the dish and has a locking recess into which extends a spring fastened in the interior of the handle, particularly during a moving of the handle onto the support bar to thereby effect a holding of the handle pressed against the wall of the dish alone through the spring tension. A one-piece constructed guide and spring element is provided for receiving the support bar and is inserted into the interior of the hollow metal handle for receiving the support bar.

9 Claims, 7 Drawing Figures

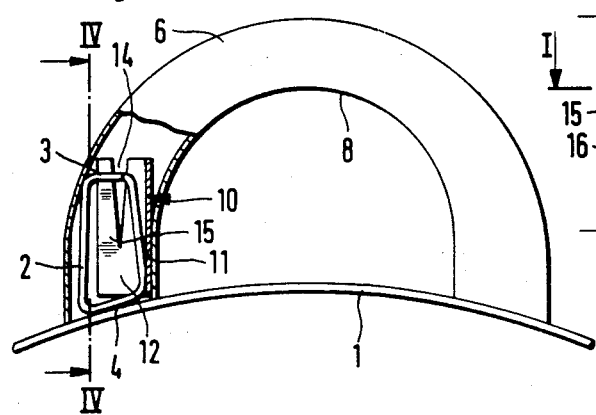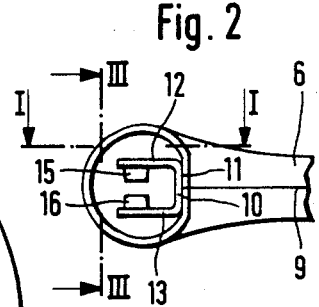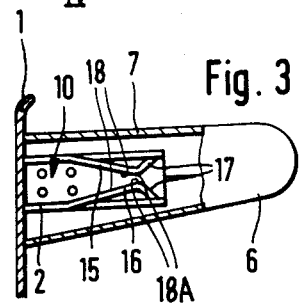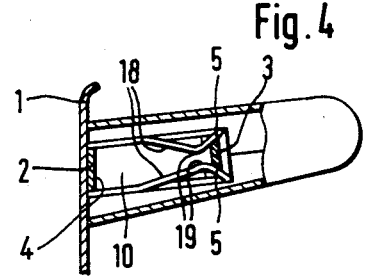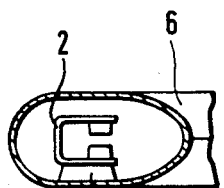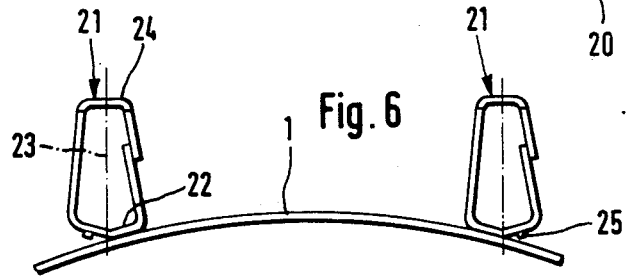

HANDLE ATTACHMENT FOR A HOLLOW ACCESSORY HANDLE WHICH IS FORMED OF SHEET METAL

FIELD OF THE INVENTION

The invention relates to a handle attachment for a hollow accessory sheet-metal handle on dishes, comprising a support bar, which is fastened on the dish, having a locking recess, into which recess extends a spring secured in the interior of the handle, during moving of the handle onto the support bar and effects a holding of the handle pressed against the wall of the dish alone through the spring tension.

BACKGROUND OF THE INVENTION

A handle attachment is known from German Auslegeschrift No. 25 01 404, which serves to secure a hollow handle with a spring which is anchored therein on a support bar which is secured on a dish. The conventional side handle which has two handle legs is held pressed by the spring against the dish, however, the spring must at the same time absorb lateral guide forces, which, since appropriate guide surfaces are lacking, makes such absorbing only very incomplete. Moreover, it is also not possible to arrange the support bars, which are secured on the dish, precisely at such a distance on the dish, such that these serve as lateral guideways for the handle. The reason here lies with the relatively large tolerances, which occur, on the one hand, during the manufacture of the attachment handle and, on the other hand, during the fastening of the support bar on the dish. Based on these fastening problems, such metal handles are fixedly connected to the dish prior to the enamelling process, which in particular brings about problems particularly when after the enamelling of certain areas of the pot are yet galvanized. Here exists the danger that acid penetrates into the hollow handle and after the galvanizing operation runs out of same again only in an incomplete manner, so that the acid residues, due to the long period of action, can result in damages.

In the case of handles which are manufactured of plastic, the problems of the lateral guiding of the handle on the support bars do not exist, since here suitable guide surfaces can be formed into the handle. Such handles show, however, the disadvantage that these are neither temperature resistant, nor permanently dishwasher safe.

The basic purpose of the invention is to provide a side-handle attachment for a handle of the above-mentioned type such that during a subsequent fastening of the handle, same is permanently clearance-free securable on the dish, that the handle attachment is simple in design, inexpensive to manufacture and easily attachable in the handle and to the dish. A further purpose of the invention consists in the support bar for the handle attachment being constructed such that same can be used both for the right and also for the left handle attachment.

This purpose is attained inventively by inserting into the hollow metal handle a one-piece constructed guide and spring element for receiving the support bar, which on the one side has guide surfaces for the support bar and from which on the other side project one or several leaflike springs, which cooperate with the locking recesses of the support bar.

According to an advantageous embodiment of the invention, the guide and spring element consists of a U-shaped profile, which is secured with its back wall to the inner wall of the hollow handle, wherein one or both springs legs are slotted over a portion of their length and wherein the free ends of the legs are formed V-shaped.

Hollow metal handles of the aforementioned type are formed advantageously of a sheet metal, whereby said sheet metal forms a joint on one side of the handle. On this one side, the U-shaped profile is welded on at its back wall, namely, such that the back wall grips or extends over the joint and during the welding, the two ends or edges of the sheet metal are fixed to one another. Such a welding is at any rate necessary, so that the mounting of the inventive guide and spring element does not require any additional operation. The form and the height of the support bar are thereby adjusted or proportioned in such a manner to the guide and spring element, that the forces, which act perpendicularly with respect to the wall of the dish onto the handle, are transmitted directly by the guide and spring element onto the support bar. The springs, which are integrated into the guide element and which are constructed V-shaped and cooperate in the moved-on condition with the locking recesses of the support bar, permanently and in a clearance-free manner press the handle against the wall of the dish, so that same during a normal load is fixedly connected to same. Through the form of slope of the V-shaped spring, however, the handle, without that a damage to the dish or to the support bar occurs, can again be pulled off from the dish with an increased force, which permits an exchange of the handle.

The support bar has in the top view a substantially rectangular shape. According to an advantageous form of construction of the support bar, same is constructed symmetrically with respect to its two longitudinal sides, whereby the plane of symmetry extends through the center of the two short sides. The short side which is to be fastened on the pot is thereby constructed V-shaped, whereby the tip or apex of the V lies in the plane of symmetry. The angle defined by this V-shape is thereby adjusted or conformed to the dish wall, whereby advantageously the angle is adjusted to a medium dish wall, so that the support bar can be utilized both for the larger and also for the smaller dishes, without creating a troublesome inclination from the desired direction of the welded-on support bar on larger or smaller pots.

BRIEF DESCRIPTION OF THE DRAWINGS

One exemplary embodiment of the invention is described in greater detail hereinafter with reference to the drawing, in which:

FIG. 1 is a partial cross-sectional top view of an accessory handle;

FIG. 2 is an end view into the opening of one leg of a handle provided with an inventive handle attachment;

FIG. 3 is a cross-sectional view taken along the line III—III of FIG. 2;

FIG. 4 is a cross-sectional view taken along the line IV—IV of FIG. 1;

FIG. 5 is a cross-sectional view of a further embodiment of a side handle;

FIG. 6 is a horizontal cross-sectional view of a dish having inventive support bars welded thereon;

FIG. 7 is an end view of a support bar which is a component of the handle of FIG. 1.

DETAILED DESCRIPTION

In the embodiment which is illustrated in the drawing, two spaced support bars 2 are welded on a wall 1 of a dish, of which only the left bar is illustrated. Each support bar 2 consists of an annular sheet-metal strip having a substantially rectangular shape viewed in the top view (FIG. 1), whereby the side wall 3 remote from the wall 1 of the dish is slightly shorter than the side wall 4 which is welded to the wall 1 of the dish. Further, the side walls 3 and 4 are not parallel to each other. The height of the support bar 2 can be seen from FIG. 4. The side wall 3 of the support bar has recesses 5 (FIG. 7) on both sides thereof, each forming a locking recess. A hollow metal handle 6 is secured on the support bar 2, which handle 6 is formed of a sheet metal 7. An abutting joint 9 (FIG. 2) is formed on the inside surface 8 of the handle.

A U-shaped profile 10 is welded into the hollow metal handle 6, namely such that its back wall or bight portion 11 is welded to the inner wall of the hollow handle 6 overlapping the joint 9. The welding points for fastening of the U-shaped profile in the hollow side handle 6 are positioned so as to lie on both sides of the joint 9, so that at the same time the hollow handle 6 is fixed in its form. The two legs 12,13 are, as this can best be seen in FIG. 1, provided with a slot 14 over a portion of its length, so that the portion of the legs 12,13 remote from the back wall 11 each form a spring 15,16, respectively. The springs, as can best be seen in FIGS. 2 to 4, are V-shaped in form and opposed to one another, so that a sloped mounting surface 18 and a sloped clamping surface 17 are formed.

The height of the support bar 2 is adjusted or in proportion to the distance between the legs 12,13 of the U-shaped profile 10, so that a fixation of the handle parallel to the pot wall is achieved. Through the lateral dimensions of the support bar, which on the one side rest on the inner side of the back wall 11 of the U-profile and on the other side on the inner wall of the metal handle 6, a lateral fixation of the handle relative to the dish 1 is assured, so that all forces which do not act perpendicularly with respect to the wall of the dish are transmitted by the metal handle 6 directly onto the support bar.

When moving the U-shaped guide and spring element 10 onto the support bar 2, the sloped mounting surface 18 of the opposed springs 15,16 first come into contact with the support bar, so that the springs are spread apart. After the apexes 18A of each of the V-shaped springs 15,16 have passed over the rear side 3 of the support bar 2, the springs again relax somewhat by particularly corresponding with the form of the clamping surface 17. The inwardly directed force of the clamping surfaces 17 on the rear side 3 causes the handle to be moved or urged toward the dish 1. As a result, the dish handle 6 is firmly held in place by a certain prestressing force, generated by the springs 15,16 against the dish 1.

The U-shaped profile 10 thus does not only form the springs for securing the handle on the dish, but moreover also performs guiding and holding functions for the handle, namely for the forces which act substantially parallel with respect to the wall of the dish. Moreover, during a fastening of the U-shaped profile inside of the handle, the handle, which is formed of a sheet metal, becomes fixed in its form. As a result, only the required welding of the profile 10 to the handle is necessary in order to effect a preserving of the shape of the handle. The inventive guide and spring element 10 is to be distinguished by an extremely simple design, so that it is now possible with little expense to secure a metal handle on a wall of a dish permanently and without clearance.

FIG. 5 illustrates a further embodiment of a handle. In this embodiment, in contrast to the exemplary embodiment according to FIG. 2, the support bar is not directly secured at its back wall to the handle, but with its one leg on a projection 20, which is secured to the metal handle 6. The attachment of the handle with the handle attachment is moreover the same as is described in connection with the exemplary embodiment according to FIGS. 1 to 4.

FIG. 6 illustrates a further embodiment of a support bar 21, which has a substantially rectangular design in the top view. The short side wall 22 is V-shaped. One leg of the V-shaped side wall 22 of the support bar 21 is secured to the wall 1 of the dish. The plane of symmetry 23 extends through the center of the opposed short side walls 22 and 24 of the rectangular-shaped side wall. The V-shaped angle of the short side wall 22 is chosen such that the support bar 21, which is secured with the short side wall 22 on the wall 1 of the dish, has the alignment directed toward the dish, so that the desired abutment of the support bar 21 both on the metal handle 6 and also on the U-shaped profile 10 is obtained in the aforedescribed manner.

FIG. 6 illustrates both the left side and right side fastenings of identical support bars 21 to the side wall of the dish 1, however, the right side is welded to the dish at the other leg of the narrow V-shaped side wall 22. Here too the alignment is proportioned so that the engagement of the metal handle with the U-shaped profile 10 is achieved in the desired manner. Through the special construction of the support bar, one single support bar can be used for both sides or ends of the handle, which substantially simplifies the inventory requirements. For fastening of the support bar 21 on the wall 1 of the dish, same is provided in a conventional manner with welding nipples 25.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A handle apparatus for a dish, comprising:
a support member which is an elongate sheet metal strip bent into a substantially rigid and approximately rectangular loop, said loop having a first side which is fixedly secured to an external surface of said dish, a second side which projects outwardly from said external surface, and a third side which is opposite said first side thereof and which has a locking recess provided in an edge portion thereof, an outwardly facing side surface of said second side of said loop serving as a first guide surface on said support member, and opposite edge portions of said loop formed from said sheet metal strip which each extend along said second and third sides of said loop respectively serving as second and third guide surfaces on said support member;

a hollow handle part having an opening extending into an end thereof which faces said external surface of said dish, said handle part being formed from a single sheet metal plate which is bent into an approximately annular shape so that opposite edge portions thereof are adjacent;

a guide element which is disposed in said opening in said handle part and which is a single piece of sheet metal bent into a U-shape and having a back wall and two spaced legs, said back wall being fixedly secured to a surface of said sheet metal plate forming said handle part and said guide element being oriented so that said back wall and said legs each extend substantially parallel to said second side of said support member, said back wall having on an inwardly facing side thereof a first guide surface and said legs respectively having on inwardly facing sides thereof second and third guide surfaces, said support member being slidably received between said legs of said guide element so that said first, second and third guide surfaces on said support member respectively slidably engage said first, second and third guide surfaces on said guide element to thereby prevent movement of said handle part relative to said external surface of said dish in said directions in which said first, second and third guide surfaces on said guide element face and to prevent rotation of said handle part relative to said dish about an axis perpendicular to said external surface of said dish, said guide element further having an elongate, resilient leaf spring element provided on and integral with one of said legs thereof and extending in a direction approximately parallel to said second side of said support member, said resilient spring element engaging said locking recess in said support member and yieldably urging said guide element and said handle part in a direction toward said external surface on said dish.

2. A handle apparatus for a dish, comprising: a sheet metal plate bent to form a hollow handle part having an opening extending thereinto from an end thereof adjacent an external surface of said dish; a support member fixedly secured to and projecting outwardly from said external surface of said dish, said support member being received in said opening in said handle part and having first, second and third guide surfaces thereon which are each approximately normal to said external surface of said dish and which each face outwardly in a different direction; a guide element disposed within said opening in said handle part and fixedly secured to a surface portion of said metal plate which is approximately normal to said external surface of said dish, said guide element having first, second and third guide surfaces thereon which respectively face and slidably engage said first, second and third guide surfaces on said support member to thereby prevent movement of said handle part relative to said external surface of said dish in said directions in which said first, second and third guide surfaces on said guide element face; and means for resiliently urging said end of said handle part into engagement with said external surface of said dish, including a leaf spring element which is provided on said guide element integral therewith and which engages a locking recess provided in said support member.

3. The apparatus according to claim 2, wherein said guide element is U-shaped and has a back wall and first and second legs, wherein said back wall is fixedly secured to said surface on said sheet metal plate forming said handle part, wherein said first leg of said U-shaped guide element has a slot extending a portion of the width thereof, and wherein an end of said first leg remote from said back wall is said spring element and has a V-shaped bend, said support member being slidably received between said legs of said guide element.

4. The apparatus according to claim 3, wherein said support member has two of said locking recesses on opposite sides thereof, and wherein said second leg of said guide element has a slot therein extending a portion of the width thereof and has an outer end which serves as a further spring element, each of said spring elements being received in a respective said locking recess in said support member.

5. The apparatus according to claim 3, wherein said back wall of said U-shaped guide element extends across a joint defined by adjacent edge portions of said sheet metal plate from which said handle part is formed, said guide element being fixedly secured to each of said edge portions of said sheet metal plate.

6. The apparatus according to claim 3, wherein said first and second legs of said guide element are approximately parallel and are approximately normal to said back wall thereof, and wherein inwardly facing surface portions on said back wall and said first and second legs respectively serve as said first, second and third guide surfaces, said cooperating guide surfaces on said support member and said guide element preventing rotation of said handle part relative to said dish about an axis perpendicular to said external surface of said dish.

7. The apparatus according to claim 2, wherein said support member is made from an elongate strip of sheet metal which is bent to form substantially a rectangular, and wherein a side wall of said rectangular support member remote from said wall of said dish has said locking recess therein.

8. The apparatus according to claim 7, wherein said support member is substantially symmetric about a plane which bisects each short side wall thereof, wherein one of said short side walls has two sections which define a V-shape, wherein said external surface of said dish is convexly curved and one of said sections of said one short side wall is fixedly secured to said wall of said dish, and wherein the angle between said two sections of said one short side wall has a predetermined size which is selected with regard to the curvature of said wall of said dish so as to effect a predetermined orientation of said support member with respect to said wall of said dish.

9. The apparatus according to claim 8, wherein said angle is selected to correspond to the curvature of the wall of a medium-size dish.

* * * * *